(12) United States Patent  (10) Patent No.: US 8,262,152 B2
Okumura et al.  (45) Date of Patent: Sep. 11, 2012

(54) PILLAR STRUCTURE FOR AUTOMOBILE

(75) Inventors: Hiroshi Okumura, Kariya (JP); Akira Oosumi, Nagoya (JP); Shinichi Shibasaki, Nagoya (JP)

(73) Assignee: Toyota Shatai Kabushiki Kaisha, Kariya (JP)

( * ) Notice: Subject to any disclaimer, the term of this patent is extended or adjusted under 35 U.S.C. 154(b) by 212 days.

(21) Appl. No.: 12/679,120

(22) PCT Filed: Nov. 10, 2008

(86) PCT No.: PCT/JP2008/070394
§ 371 (c)(1),
(2), (4) Date: Mar. 19, 2010

(87) PCT Pub. No.: WO2009/072371
PCT Pub. Date: Jun. 11, 2009

(65) Prior Publication Data
US 2010/0231003 A1 Sep. 16, 2010

(30) Foreign Application Priority Data
Dec. 7, 2007 (JP) .................................. 2007-316533

(51) Int. Cl.
*B62D 25/04* (2006.01)
(52) U.S. Cl. .......... 296/193.06; 296/187.12; 296/203.03
(58) Field of Classification Search ............. 296/187.12, 296/193.06, 146.6, 203.01, 203.02, 203.03
See application file for complete search history.

(56) References Cited

U.S. PATENT DOCUMENTS 6,332,643 B1 * 12/2001 Sukegawa et al. ....... 296/203.03
6,409,257 B1    6/2002 Takashina et al.
6,983,981 B2 *  1/2006 Saeki ....................... 296/187.12

FOREIGN PATENT DOCUMENTS

JP  U-4-137971  12/1992
(Continued)

OTHER PUBLICATIONS

Aug. 24, 2011 Office Action issued in Chinese Application No. 20088012479.2 (with partial Translation).
(Continued)

*Primary Examiner* — Dennis Pedder
(74) *Attorney, Agent, or Firm* — Oliff & Berridge, PLC

(57) ABSTRACT

A pillar structure that reduces bending deformation of the pillar toward the vehicle interior, during a vehicle side collision, by suppressing cross-sectional collapse of the pillar. In a pillar which is erected on a side face of a body of an automobile and in which an outer panel and an inner panel form a closed cross-section, at sites where a collision load is likely to act strongly and locally during a side collision such as a site opposing an end of an impact beam that is provided inside a front door and that extends in the front-rear direction, and a site where a hinge joint is formed, grooves having a substantially square C-shaped cross section are formed in a front face portion, of an outer panel having a hat-shaped cross section, that faces toward the front of the vehicle, and/or a rear face portion thereof that faces toward the rear of the vehicle. The grooves are formed over the entire width in the vehicle width direction of the front face portion and rear face portion in a substantially horizontal direction. According to this configuration, during a side collision, the collision load is received by ridge portions of the grooves, whereby collapse deformation of the pillar is reduced.

2 Claims, 5 Drawing Sheets

FOREIGN PATENT DOCUMENTS

| | | |
|---|---|---|
| JP | A-8-2438 | 1/1996 |
| JP | A-9-20267 | 1/1997 |
| JP | A-9-254810 | 9/1997 |
| JP | A-2000-108662 | 4/2000 |
| JP | A-2003-127901 | 5/2003 |
| JP | A-2005-67582 | 3/2005 |

OTHER PUBLICATIONS

Jan. 20, 2009 International Search Report issued in PCT/JP2008/070394.

Jan. 20, 2009 Written Opinion issued in PCT/JP2008/070394 (with translation).

* cited by examiner

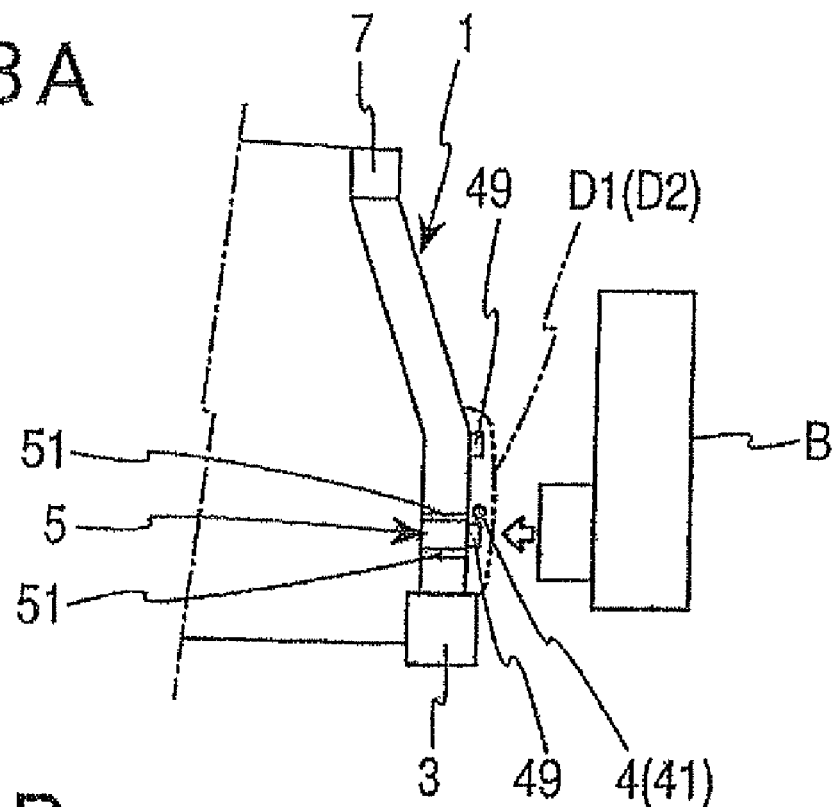
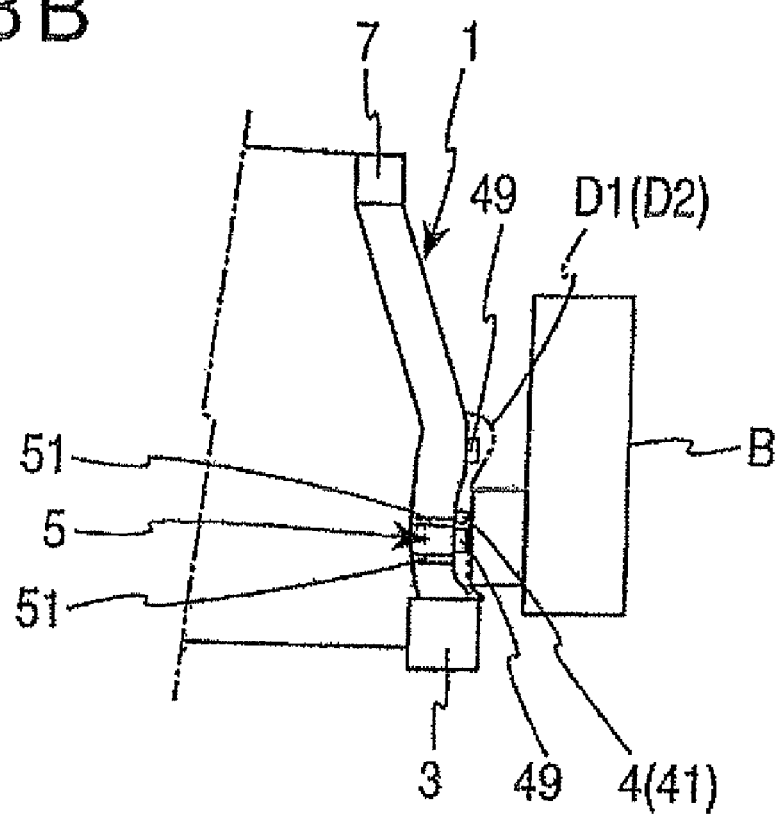

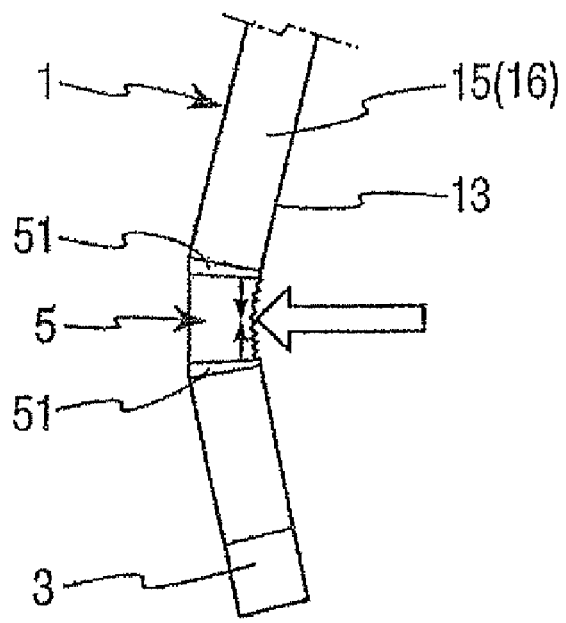
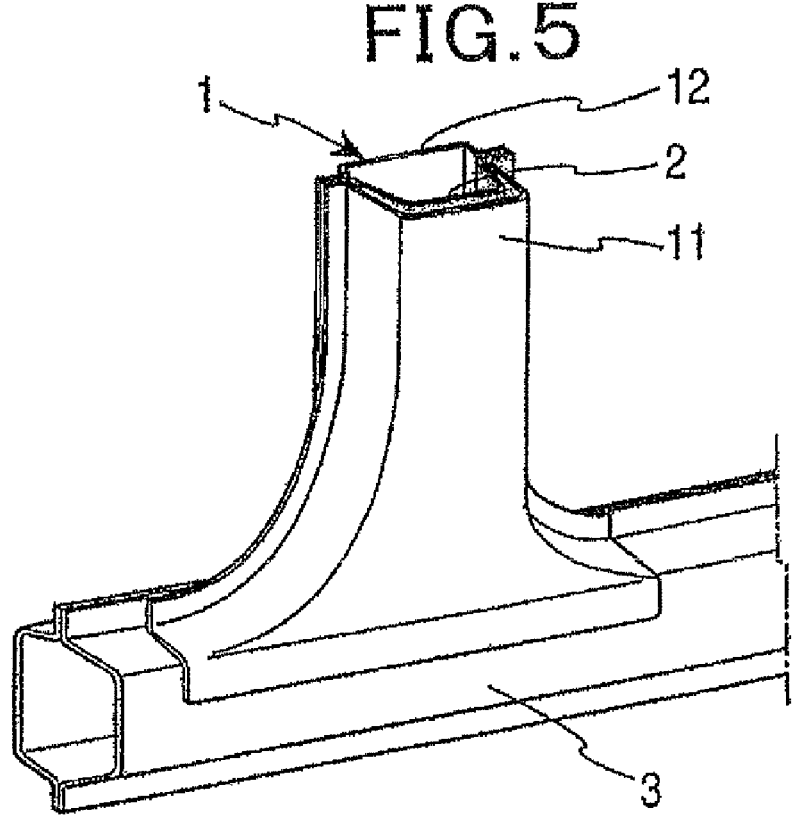

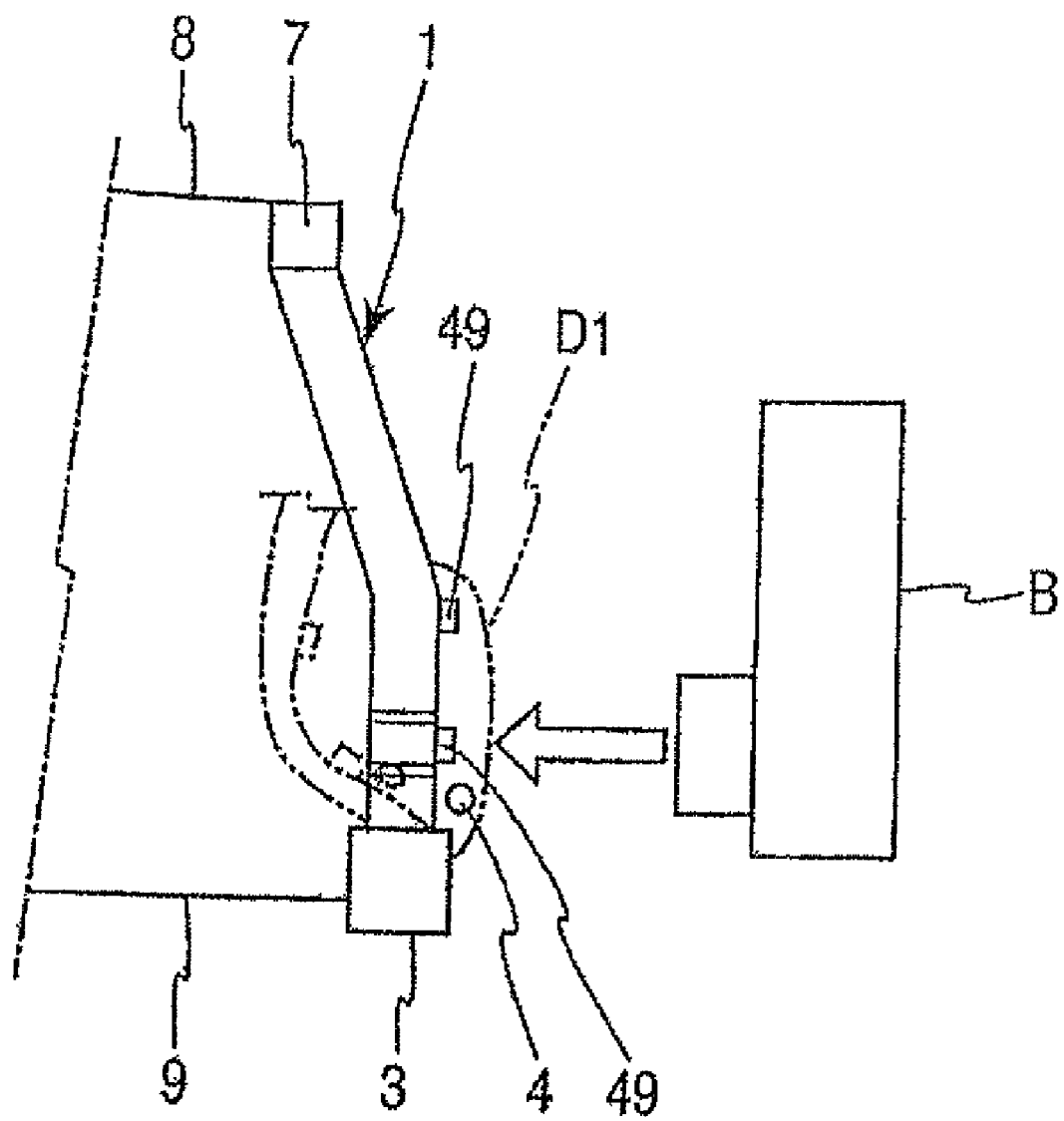

PILLAR STRUCTURE FOR AUTOMOBILE

TECHNICAL FIELD

The invention relates to a pillar structure for an automobile, in particular to a pillar structure for an automobile in which collapse of a pillar is prevented during a vehicle side collision, to suppress thereby deformation of the pillar into the vehicle compartment.

BACKGROUND ART

In a pillar structure for an automobile exemplified by the center pillar illustrated in FIG. 5, a center pillar 1 has an outer panel 11 having a substantially hat-shaped cross, section that opens toward the vehicle interior, and an inner panel 12 that is substantially shaped as a flat plate or has a shallow substantially hat-shaped cross section, at an orientation inverse to that of the outer panel 11. The outer panel 11 and the inner panel 12 make up a closed cross-section structure. Inside the pillar there is provided a pillar reinforcement 2 in the upper-to-lower direction of the pillar, the pillar reinforcement 2 having a substantially hat-shaped cross section and running along the inner face of the outer panel 11. The pillar reinforcement 2 strengthens the stiffness of the pillar (for instance, Patent document 1).

In FIG. 5, the reference numeral 3 denotes a rocker joined to the lower end of the center pillar 1.

At the lower portion of the center pillar 1 that opposes the bumper of another vehicle B during, a vehicle side collision, as illustrated in FIG. 6 (the figure illustrates a barrier used in a collision test), there is positioned a rear end of an impact beam 4 disposed in the front-rear direction at the lower portion in a front door D1 that opens and closes a front door opening frontward of the center pillar 1, and also there is disposed a hinge member 49, which hinges the front edge of a rear door that opens and closes the rear door opening in the rear of the center pillar 1.

During a side collision, therefore, a substantial collision load acts on the lower portion of the center pillar 1, via the hinge member 49 and the rear end of the impact beam 4. In this case, the pillar reinforcement 2 disposed in the pillar in the upper-to-lower direction of the pillar is not found to be strong enough to withstand the locally substantial acting force. The cross section of the pillar lower portion breaks down on account of the acting force. This results in collapse deformation in the vehicle width direction, as denoted by the virtual line in FIG. 6. Once collapse deformation occurs, resistance to the collision load may be lost, so that the lower portion of the pillar bends significantly into, a V-shape, and the entire pillar shifts in the vehicle width direction, thereby pressing the vehicle interior.

In FIG. 6, the reference numeral 7 denotes a roof side rail to which the upper end of the center pillar 1 is connected, 8 denotes a roof, and 9 a floor.

The stiffness of the pillar could be reinforced by thickening the plate of the pillar reinforcement 2, and/or by increasing pillar stiffness locally by way of a bulkhead that partitions a closed cross-section in the pillar in the upper-to-lower direction of the pillar, as disclosed in Patent document 2.

Patent document 2 discloses the feature of reinforcing the stiffness of an intermediate portion of a center pillar in the upper-to-lower direction of the pillar.

Patent document 1: Japanese Patent Application Publication No. 2003-127901 (JP-A-2003-127901)

Patent document 2: Japanese Patent Application. Publication No. 9-20267 (JP-A-9-20267)

DISCLOSURE OF THE INVENTION

Problems to be Solved by the Invention

To accommodate ever more safety-conscious users, the plate thickness of the pillar reinforcement 2 can be made thicker in order to ensure safety during side collisions, but doing so results in a heavier vehicle, which is problematic. Likewise, providing bulkheads in the pillar results in a complex structure that entails lower productivity and higher costs, all of which is problematic.

Therefore, it is an object of the invention to realize a pillar structure for an automobile, that is simple and has good productivity, in which the stiffness of the pillar can be enhanced without incurring increased weight, and in which cross-sectional collapse of the pillar structure during a side collision can be reduced, to prevent thereby deformation of the pillar toward the vehicle interior.

Means for Solving the Problems

The invention is a pillar erected along the vertical edge of a door opening at a side surface of the body of an automobile, such that an outer panel and an inner panel of the pillar form a closed cross section. At a site of the pillar where a collision load is likely to act strongly and locally during a vehicle side collision, a groove or crest portion having a substantially square C-shaped cross section is formed in either or both of a front face portion, of the outer panel having a hat-shaped cross section, that faces toward the front of the vehicle and a rear face portion thereof that faces toward the rear of the vehicle, the groove or crest portion being formed over the entire width of the front face portion and rear face portion in a substantially horizontal direction (claim 1).

During a vehicle side collision, pillar collapse can be mitigated through stiffening of ridge portions of the groove or crest portion and that are formed, in the direction in which the load acts, in the pillar lower portion, even when a locally large collision load acts on account of the collision of the bumper of another vehicle against the lower portion of the pillar.

The pushing of the other vehicle gives rise to a bending force that acts on the lower portion of the pillar. However, the lower portion of the pillar does not collapse easily, and hence the resistance of the pillar toward the bending force can be preserved, so that the lower portion of the pillar does not bend and deform extensively into a C-shape.

The groove or crest portion is formed in the outer panel at a lower portion of the pillar that faces, in the vehicle width direction, an end of an impact beam that is provided at a lower portion inside a door and extends in the front-rear direction, upon closing of the door for closing and opening the door opening (claim 2).

The groove or crest portion is formed at a hinge joint, on which the door is hinged, in the outer panel in the pillar lower portion (claim 3).

Locally significant collision loads act on the pillar lower portion, in particular at a site corresponding to the end of an impact beam in the door, and at a hinge joint onto which a hinge member is mounted. Therefore, bending of the pillar can be reduced in a particularly effective way by forming the groove or crest portion at these sites, in the direction in which the collision load acts.

BEST MODE FOR CARRYING OUT THE INVENTION

An explanation follows next on an embodiment in which the invention is used in the lower portion of a center pillar.

As illustrated in FIGS. 1 and 2, a center pillar 1 is erected along the rear edge of a front door opening F at the side surface of a body. The center pillar 1 is provided in such a manner that the lower end thereof is joined to a front-rear intermediate position of a rocker 3 that extends in the front-rear direction along the lower edge of the vehicle side surface, and in such a manner that the upper end of the center pillar 1 is joined to a front-rear intermediate position of a roof side rail 7 that extends in the front-rear direction along the upper edge of the vehicle side surface, whereby the center pillar 1 partitions the front door opening F from a rear door opening R.

The center pillar 1 has an outer panel 11 having a substantially hat-shaped cross section that opens toward the vehicle interior, and an inner panel 12 that has a shallow hat-shaped cross section and is opened toward the vehicle exterior. Side-edge flanges at the front and rear sides of the panels 11, 12 are overlappingly joined to each other, to make up thereby a closed cross-section structure.

A reinforcement 2 having a hat-shaped cross section is disposed along the inner face of the outer panel 11, inside the center pillar 1. Side-edge flanges at the front and rear sides of the reinforcement 2 are integrally joined to side-edge flanges of the outer and inner panels 11, 12. The lower portion of the center pillar 1 is formed so as to widen somewhat, as it runs downward, in the front-rear direction as compared with the upper general portion of the center pillar 1.

As illustrated in FIGS. 1, 2 and 3, an impact beam 4 is disposed, in the front-rear direction, inside and at the lower portion of a front door D1 that opens and closes the front door opening F. Upon closing of the front door D1, the rear end 41 of the impact beam 4 stands at a position opposite, in the vehicle width direction, to the front half of the lower portion of an outer surface portion 13 of the outer panel 11 of the center pillar 1 that faces out of the vehicle. A front end 40 of the impact beam 4 is positioned so as to oppose the lower portion of a front pillar 6.

At the rear half of the lower portion of the outer surface portion 13 at the bottom of the center pillar 1 there is formed a hinge joint 14 for joining to a binge member 49 (FIG. 3) at the lower end side of the front edge of a rear door D2 that opens and closes the rear door opening R. The hinge joint 14 has screw holes formed in a projection of the outer surface portion 13 that protrudes slightly out of the vehicle. The binge member 49 is bolted into these screw holes. Similarly to the hinge joint 14, a hinge joint 14a for hinging the upper end side of the front edge of the rear door D2 is provided at the intermediate portion of the center pillar 1 in the upper-to-lower direction of the pillar 1.

A shallow groove 5, having a substantially square C-shaped cross section, is formed at a front face portion 15 that faces toward the front door opening F (frontward), at the lower portion of the center pillar 1 that opposes the rear end 41 of the impact beam 4 of the front door D1 and that is provided with the hinge joint 14 for the rear door D2. The groove 5 is formed substantially horizontally and extends from a bent portion at the boundary between the front portion 15 and the outer surface portion 13, across the entire vehicle width direction of the front face portion 15, up to the side-edge flange to which the inner panel 12 is joined. As a result, respective ridge portions 51, 51 are formed in the horizontal direction, at substantially respective right angles, at the upper and lower sides of the opening of the groove 5 and at the upper and lower sides of the bottom face of the groove 5.

A groove 5, corresponding and identical to the groove 5 of the front face portion 15, is provided, at substantially the same height, over the entire width in the vehicle width direction of a rear face portion 16, at the lower portion of the center pillar 1, that faces toward the rear door opening R (rearward).

The grooves 5, 5 of the front face portion 15 and the rear face portion 16 are positioned at substantially the same height as the hinge joint 14. The groove 5 of the rear face portion 16 has substantially the same width in the upper-to-lower direction of the pillar as that of the hinge joint 14, and is contiguous to the rear end of the hinge joint 14.

During a vehicle side collision, a locally large collision load acts on the lower portion of the center pillar 1, via the rear end 41 of the impact beam 4 of the front door D1 and via the hinge member 49 of the rear door D2. In such a situation, the upper and lower ridge portions 51, 51 of the grooves 5, 5 of the front face portion 15 and the rear face portion 16, which extend in the direction in which the collision load acts, receive the collision load at the lower portion of the center pillar 1. Collapse deformation of the lower portion of the center pillar 1 is reduced thereby. Bending of the center pillar 1 caused by the above collapse is suppressed as a result (FIG. 3B).

When a yet larger collision load acts on the lower portion of the center pillar 1, as indicated by the white arrow of FIG. 4, the acting load causes the lower portion of the pillar to bend into a V shape, as illustrated in FIG. 4, about the point at which the pillar opposes the rear end of the impact beam and the hinge member. However, the ridge portions 51, 51 suppress collapse deformation, and hence the lower portion of the pillar bends while substantially preserving the cross-sectional shape thereof. As a result, resistance of the pillar against the bending load does not drop abruptly. Herein, a compressive force acts on the outer surface portion of the lower portion of the pillar, in the axial direction (upper-to-lower direction) of the pillar, so that the collision energy is absorbed during the process of compression. As a result, the cross-sectional shape preserving effect elicited by the ridge portions 51, 51 is compounded with the above-described collision energy absorbing effect. Occurrence of substantial bending is suppressed thereby, and the vehicle interior is prevented from being pressed.

In the present embodiment, the concave grooves 5 have a cross section shaped as a C. However, the grooves 5 may also be convex crest portions having a cross section shaped as an inverse C.

Also, there may be formed a pair of narrow beads that extend horizontally in the vehicle width direction and is spaced apart in the upper-to lower direction, at the front face portion and the rear face portion of the outer panel of the pillar lower portion, so that a groove having a square C-shaped cross section is formed by the two beads and by the panel surface between the beads.

The height, shape and height of the bumper of the other vehicle are subjected to variation during a vehicle side collision. Therefore, the safety of the vehicle interior can be secured to a yet greater extent by using the structure of the invention not only in the lower portion of the center pillar 1, but also at a position corresponding to the hinge joint 14a that is located at an intermediate position of the center pillar 1 in the upper-to-lower direction of the pillar and that hinges the upper portion of the front edge of the rear door D2, as illustrated in FIG. 1; or at a position corresponding to upper and lower hinge joints 61, 61 of the front pillar 6 that hinge the top and bottom front edges of the front door D1; or at an intermediate position of the front pillar 6 corresponding to the base plate 40 of the impact beam 4 of the front door D1; or at an intermediate position of the center pillar or a rear pillar, not shown in the figures, corresponding to a door lock of the front door and/or the rear door.

BRIEF DESCRIPTION OF THE DRAWINGS

FIGS. 3A, B are schematic diagrams illustrating a center pillar in an automobile in which the invention is used, before collision (FIG. 3A) and after collision (FIG. 3B), in a side collision experiment;

FIG. 4 is a schematic diagram illustrating deformation of a center pillar when acted upon by a substantial collision load;

FIG. 5 is a schematic perspective-view diagram of the lower portion of a conventional center pillar of an automobile; and FIG. 6 is a schematic diagram illustrating the deformed state in a side collision experiment conducted on a center pillar having a conventional structure.

DESCRIPTION OF THE REFERENCE NUMERALS

Figure 1:
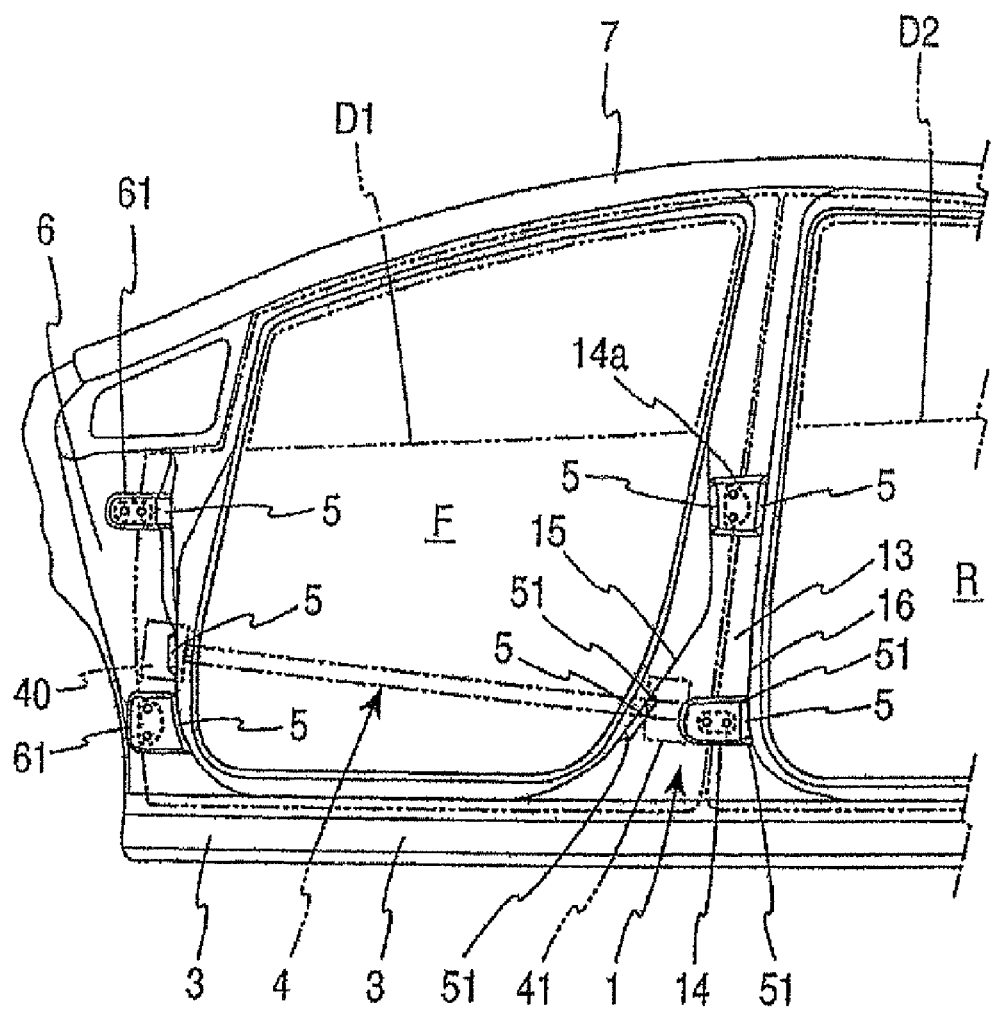
FIG. 1 is a schematic side-view diagram of an automobile in which the pillar structure of the invention is used.
Figure 2:
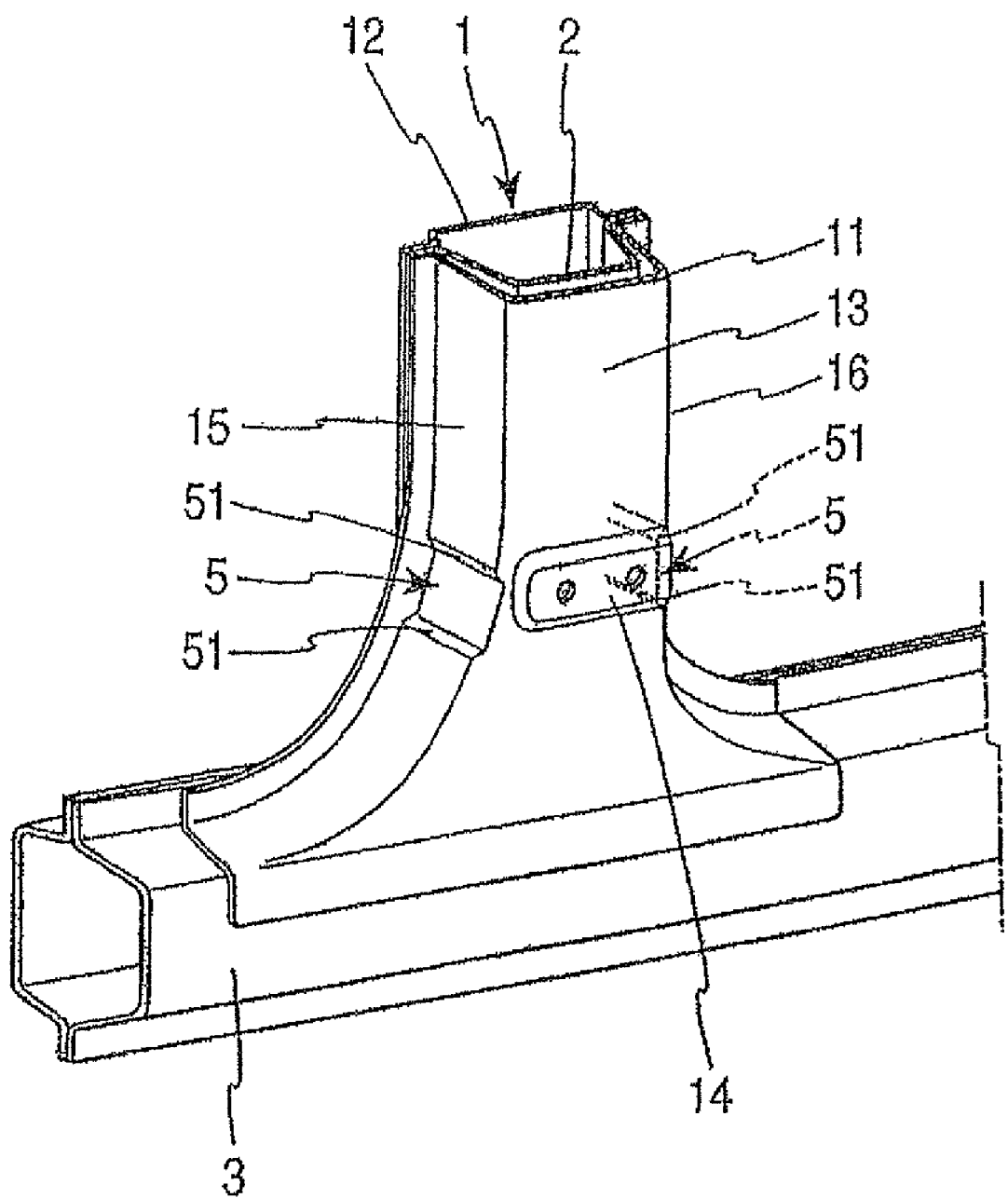
FIG. 2 is a schematic perspective-view diagram of the lower portion of a center pillar of an automobile in which the invention is used.

F, R door opening
1 center pillar
11 outer panel
12 inner panel
13 outer surface portion
14 hinge joint
15 front face portion
16 rear face portion
4 impact beam
41 rear end (end)
49 hinge member
5 groove (crest portion)
51 ridge portion of groove (crest portion)
6 front pillar
D1, D2 door

The invention claimed is:

1. A pillar structure for an automobile, the automobile including a rear door, the pillar structure comprising:
   a center pillar defining an outer surface in a vehicle width direction, and first and second grooves extending in the vehicle width direction, the center pillar having a front face portion and a rear face portion; and
   a hinge joint for the rear door, said hinge joint provided at the outer surface of the center pillar, wherein
   the first groove is provided at the front face portion of the center pillar and the second groove is provided at the rear face portion of the center pillar in longitudinal alignment with said first groove, and
   the hinge joint is arranged on the outer surface of the center pillar between the first and second grooves.

2. The pillar structure according to claim 1, further comprising ridge portions disposed in a horizontal direction and that define the grooves.

* * * * *